United States Patent [19]

Sonehara

[11] Patent Number: 5,642,282
[45] Date of Patent: Jun. 24, 1997

[54] APPARATUS FOR CONTROLLING ATTITUDE OF A ROAD VEHICLE CAB

[75] Inventor: Tsutomu Sonehara, Fujisawa, Japan

[73] Assignee: Isuzu Motors Ltd., Tokyo, Japan

[21] Appl. No.: 401,725

[22] Filed: Mar. 10, 1995

[51] Int. Cl.⁶ ............................ B62D 33/10; B60G 17/00
[52] U.S. Cl. ........................ 364/424.046; 180/89.12; 180/89.15; 280/6.1; 280/707
[58] Field of Search ................ 364/424.05; 180/89.13, 180/89.12, 89.15; 280/707, 703, 840, 43.23, 6.1, 6.11; 296/190, 35.1, 35.3

[56] References Cited

U.S. PATENT DOCUMENTS

| | | | |
|---|---|---|---|
| 3,706,470 | 12/1972 | Johnson | 269/190 |
| 3,944,017 | 3/1976 | Foster | 180/89.15 |
| 3,958,659 | 5/1976 | Selman | 180/89.15 |
| 3,966,009 | 6/1976 | Meacock, II et al. | 180/41 |
| 4,324,417 | 4/1982 | Johansson | 280/678 |
| 4,451,079 | 5/1984 | Takahashi | 296/190 |
| 4,515,234 | 5/1985 | Loy et al. | 180/89.12 |
| 5,044,455 | 9/1991 | Tecco et al. | 180/89.13 |
| 5,416,701 | 5/1995 | Kawabata | 364/424.05 |

OTHER PUBLICATIONS

Alexandridis et al., "Active Vibration Isolation of Truck Cabs" General Motor Research Laboratories, Jun. 1984.

Primary Examiner—Kevin J. Teska
Assistant Examiner—Tan Q. Nguyen
Attorney, Agent, or Firm—John E. Toupal; Harold G. Jarcho

[57] ABSTRACT

A cab is supported on a vehicle frame by hydraulic actuators, each provided with a stroke displacement sensor, and a suspension system for the frame includes a plurality of height sensors. The hydraulic actuators are driven by a control system to maintain a stable orientation of the cab in response to signals derived from the displacement and height sensors and representing vertical, longitudinal, lateral, yaw rolling and pitching vibrations of the cab.

7 Claims, 6 Drawing Sheets

APPARATUS FOR CONTROLLING ATTITUDE OF A ROAD VEHICLE CAB

BACKGROUND OF THE INVENTION

The present invention relates generally to an apparatus for controlling attitude of a road vehicle cab and, more particularly, to a hydraulic suspension mechanism for maintaining a stable cab orientation with respect to a road surface.

A hydraulic suspension system for controlling vehicle cab attitude is disclosed in Japanese Publication No. 163683/1994. However, the disclosed system merely controls three freedoms of cab movement, i.e. rolling, pitching and vertical movements. Consequently, the disclosed system fails to reduce riding discomfort caused by the lateral or longitudinal vibration of a cab.

The object of the present invention, therefore, is to provide a system which can reduce both reciprocating and rotational vibrations of a vehicle cable so as to improve riding comfort.

SUMMARY OF THE INVENTION

According to a preferred form of the present invention, a cab is supported on a vehicle frame by hydraulic actuators, each provided with a stroke displacement sensor, and a suspension system for the frame includes a plurality of height sensors. The hydraulic actuators are driven by a control system to maintain a stable orientation of the cab in response to signals derived from the displacement and height sensors and representing vertical, longitudinal, lateral, yaw rolling and pitching vibrations of the cab.

According to one feature of the invention, the stroke sensors detect a plurality of displacements of the cab directed substantially vertically, one displacement directed longitudinally through the cab's center of gravity, another displacement directed laterally through the center and a third displacement substantially spaced from the center with the latter three displacement directions lying in substantially a given plane.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
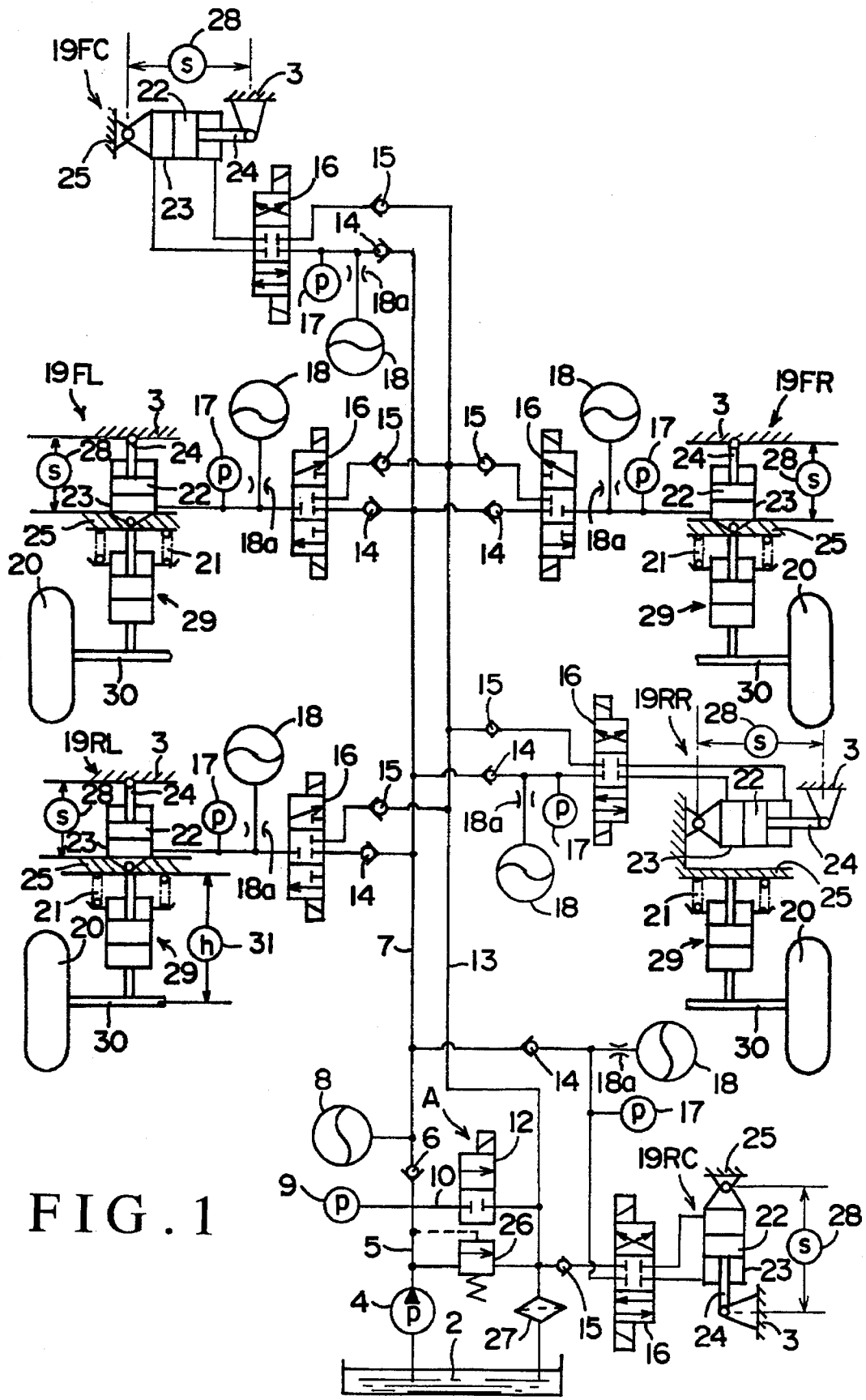
FIG. 1 is a hydraulic circuit of an attitude control system according to the present invention.

As shown in FIG. 1, a hydraulic pump 4 driven by an engine (not shown) draws oil from tank 2 and supplies the oil through a pipe 5 to an accumulator 8 of a supply pipe 7 via a check valve 6. A hydraulic monitor system A maintains the oil pressure to the pipe 7 at a predetermined value. More specifically, when a hydraulic pressure sensor 9 detects an oil pressure in the pipe 5 which exceeds a predetermined value, a valve 12 is switched to return a portion of the oil in the pipe 5 to the oil tank 2 via a pipe 10, the valve 12, a pipe 13, and a filter 27. Further, when oil pressure at a discharge port of the hydraulic pump 4 abnormally increases, part of the pressure oil in the pipe 5 is returned to the oil tank 2 via a known escape valve 26, the pipe 13 and the filter 27.

Pressure oil in the pipe 7 is supplied to six hydraulic actuators 19FL, 19FR, 19RL, 19RR, 19FC and 19RC which support six spaced apart portions of a cab 3 on a frame 25. The cab actuators 19FL–19RC are arranged between the frame 25 and the cab 3 so as to restrict adaptable conditions of rigid freedoms of cab movement. More specifically, the three actuators 19FR, 19FL, and 19RL are vertically disposed and pivotally connected between the frame 25 and, respectively, the front right, front left and rear left corners of the cab 3. The other three actuators 19RR, 19FC and 19RC are horizontally disposed in a given horizontal plane and are pivotally connected between the frame 25 and, respectively, a right rear corner of the cab 3, portion intermediate the rear front corners thereof, and a portion intermediate the right front and rear corners thereof. Acting lines of the actuators 19RR, 19FC and 19RC extend in directions that do not join at a point in the plane. Preferably, the actuator 19RR extends along the rear edge of the cab 3 in a direction spaced substantially from the center of gravity thereof and the actuators 19FC and 19RC extend in directions through the center of gravity.

Each of the actuators 19 includes a piston 22 reciprocable within a cylinder 23, a rod 24 extending from the piston 22 and pivotally connected to the cab 3 by a ball joint or the like, and a spherical bearing or the like connecting the cylinder 23 to the frame 25. Opposite chambers of the cylinder 23 defined by the piston 22 communicate with each other via an orifice throttle passage (not shown) provided in the piston 22. A cab stroke sensor 28 is disposed on each of the hydraulic actuators 19 to detect a relative cab displacement with respect to the frame 25.

An axle 30 or a suspension member of each wheel 20 of the vehicle supports the frame 25 via a known hydraulic buffer 29. Each hydraulic buffer or shock-absorber 29 includes a cylinder connected to an axle 30 and a piston having a rod connected to the frame 25. A coil spring 21 is interposed between each cylinder 29 and the frame 25. In place of the coil spring 21, the frame 25 can be suppored on the axle 30 by a known plate spring. A vehicle height frame sensor 31 for detecting a vertical frame displacement of the frame 25 with respect to an axle 30 is disposed in each corner position of the frame 25.

Pressure oil in the pipe 7 is supplied to an accumulator or pneumatic absorber 18 at each actuator 19 via a check valve 14. Associated with the cylinder 23 of each actuator 19 is an electromagnetic, proportional pressure, oil flow control valve 16 of a neutral position closed type. Also a throttle 18a is provided between each valve 16 and absorber 18. The oil pressure supplied to each cylinder 23 is detected by a hydraulic sensor 17. When an oil flow control valve 16 is switched, the oil in an end chamber of a cylinder 23 is returned to the oil tank 2 via a check valve 15, a pipe 13, and a filter 27. Although not shown, a vehicle height frame sensor 31 is provided adjacent to the suspension mechanism 29 at each of the wheels 20.

Figure 2:
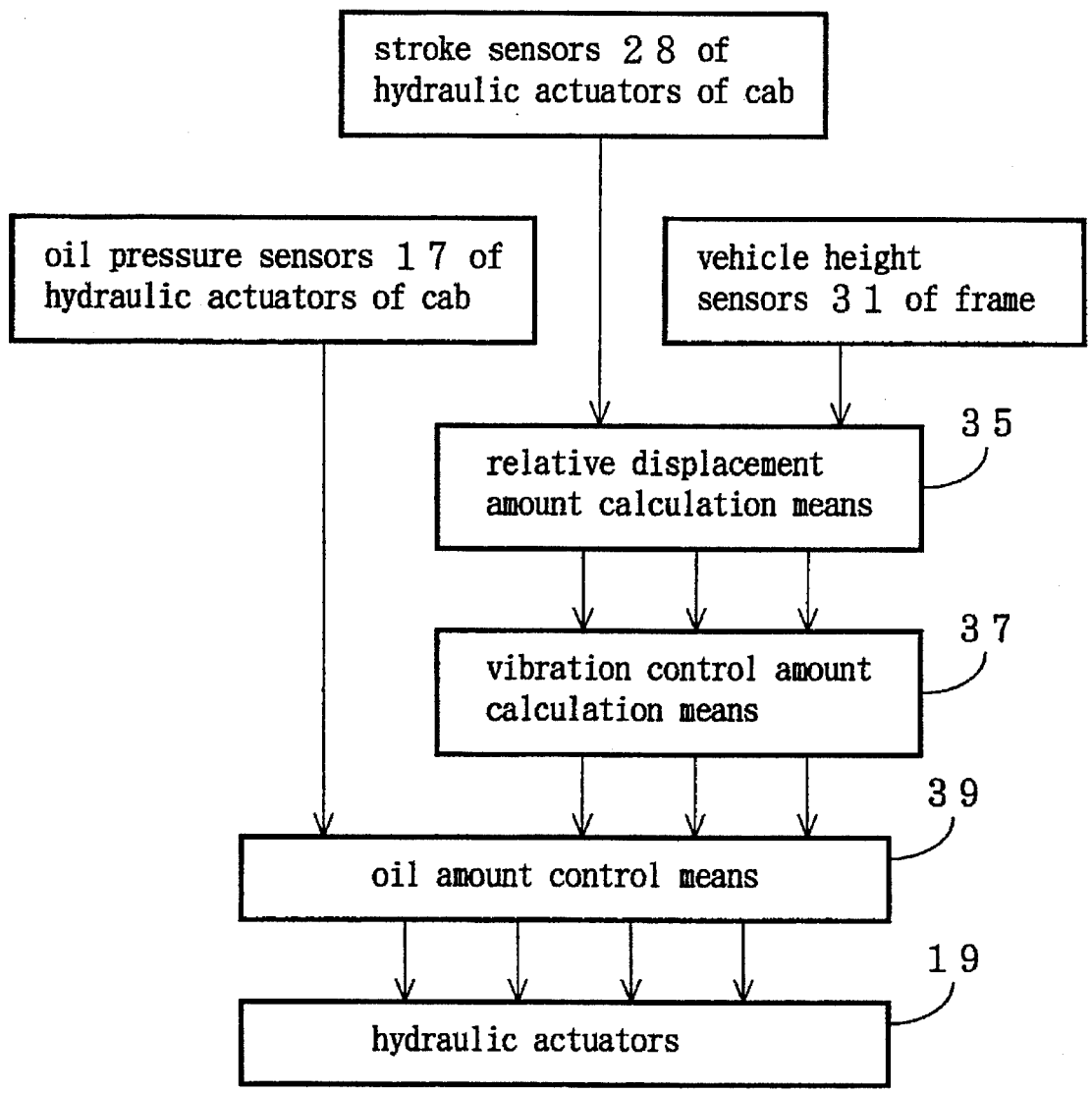
FIG. 2 is a block diagram of the attitude control system.
Figure 3:
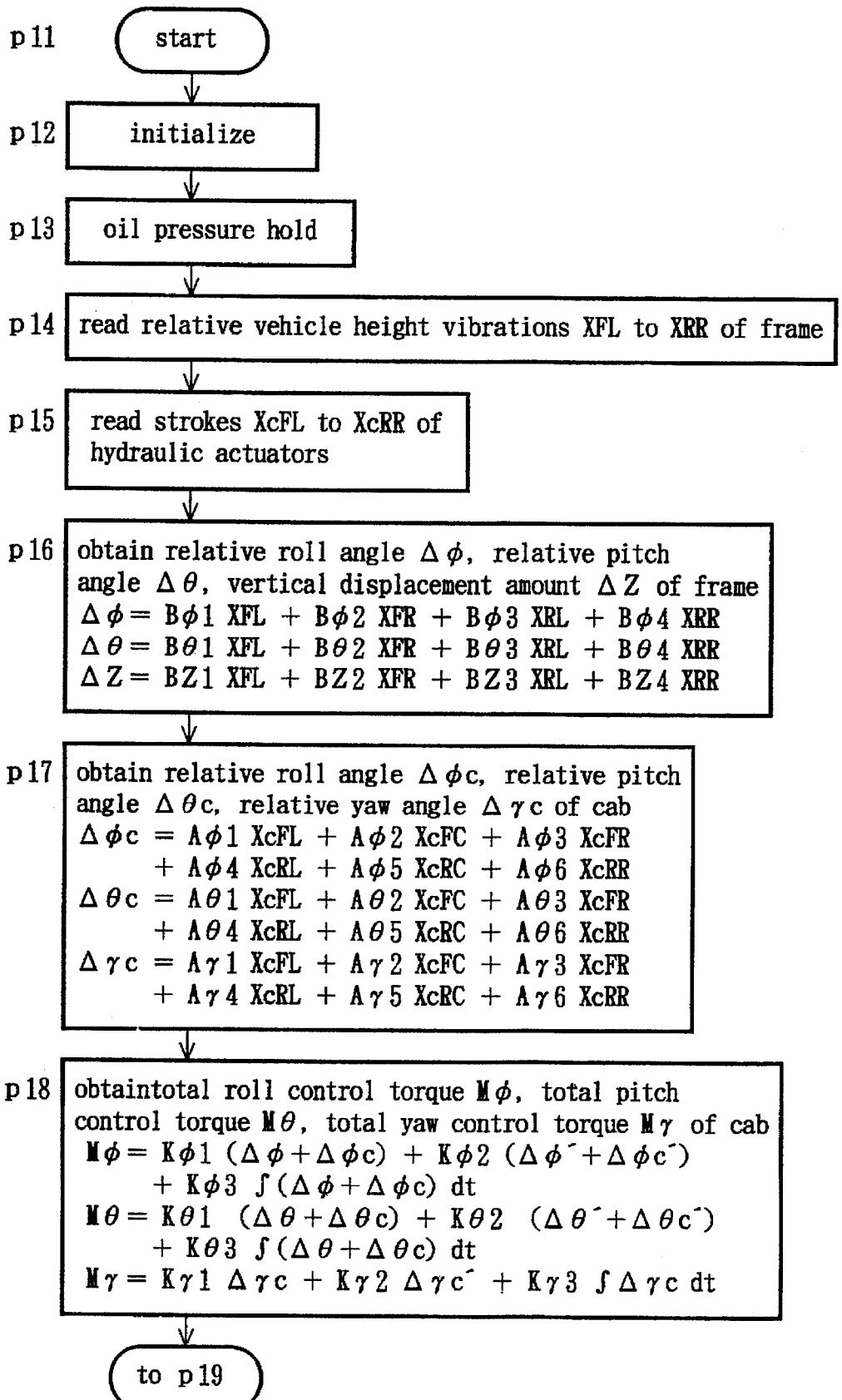
FIG. 3 is a flow diagram of an attitude control program for the system of FIG. 2.
Figure 4:
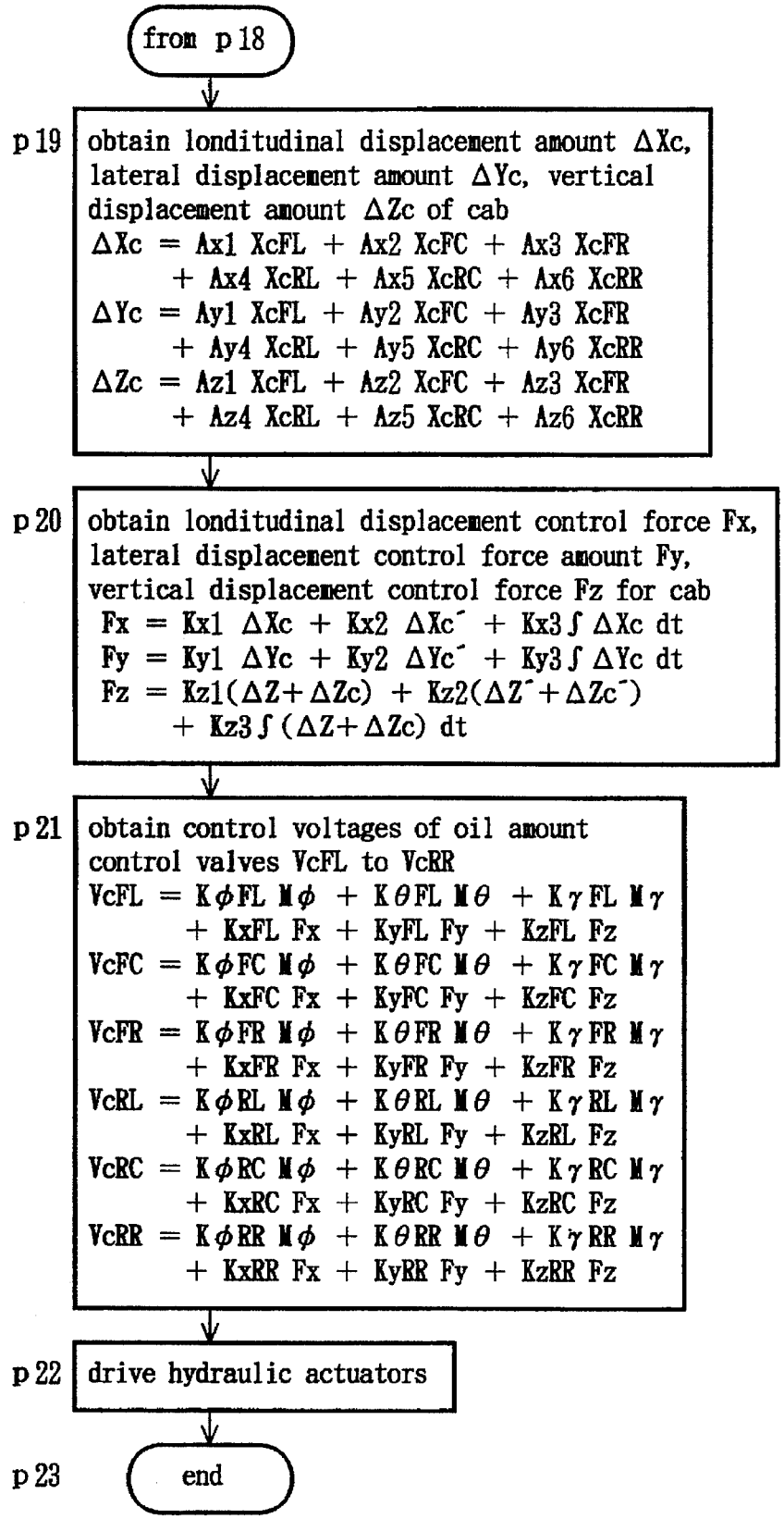
FIG. 4 is a flow diagram of an attitude control program for the system of FIG. 12.

Each of the oil flow control valves 16 controls feed-back of oil pressure at each of the hydraulic actuators 19 corresponding to a control output voltage from an electronic control device composed of an analyzer micro-computer 35, 37 (FIG. 2). In the following description, the hydraulic actuators 19 are identified by the affixes FL, FC, FR, RL, RC, and RR, respectively.

Let $\phi 2$, $\theta 2$ and $\gamma 2$ be the roll angle, pitch angle, and yaw angle of the cab 3, respectively; let X2, Y2 and Z2 be the longitudinal displacement amount, lateral displacement amount and vertical displacement amount, respectively, of the center of gravity of the cab; let $\Delta\phi c$, $\Delta\theta c$ and a $\Delta\gamma c$ be the relative roll angle, pitch angle and yaw angle, respectively, of the cab with respect to the frame; let $\Delta Xc$, $\Delta Yc$ and $\Delta Zc$ be the relative longitudinal displacement amount, the relative lateral displacement amount and the relative vertical displacement amount, respectively, of the center of gravity of the cab with respect to the frame 25; let $\Delta\phi$, $\Delta\theta$ and $\Delta\gamma$ be the relative roll angle, the relative pitch angle and the relative yaw angle, respectively, of the frame 25 with respect to the road surface; let $\Delta X$, $\Delta Y$ and $\Delta Z$ be the relative longitudinal displacement amount, the relative lateral displacement amount and the relative vertical displacement amount, respectively, of the cab on the center of gravity thereof; and let $\phi$, $\theta$ and Z be, respectively, the vertical displacement amounts, the roll angle, and the pitch angle of the cab 3 on the center of gravity thereof; then the the roll angle $\phi 2$, pitch angle $\theta 2$ and yaw angle $\gamma 2$ of the cab 3, and the longitudinal displacement amount X2, lateral displacement amount Y2 and vertical displacement amount Z2, of the cab 3 on the center of gravity of the cab are represented by the following expressions:

$\phi 2 = \phi + \Delta\phi + \Delta\phi c$ $\theta 2 = \theta + \Delta\theta + \Delta\theta c$ $\gamma 2 = \Delta\gamma + \Delta\gamma c$ $X2 = \Delta X + \Delta Xc$ $Y2 = \Delta Y + \Delta Yc$ $Z2 = Z + \Delta Z + \Delta Zc$ Control torques $M\phi$, $M\theta$ and $M\gamma$ of the total roll, pitch and yaw around the center of gravity of the cab 3, and control forces FX, FY and FZ of the longitudinal displacement, lateral displacement and vertical displacement of the center of gravity of the cab, which are given to the cab 3 by the hydraulic actuators 19, are given by the following expressions:

$M\phi = K\phi 1(\Delta\phi + \Delta\phi c) + K\phi 2(\Delta\phi' + \Delta\phi c') + K\phi 3\int(\Delta\phi + \Delta\phi c)dt$ $M\theta = K\theta 1(\Delta\theta + \Delta\theta c) + K\theta 2(\Delta\theta' + \Delta\theta c') + K\theta 3\int(\Delta\theta + \Delta\theta c)dt$ $M\gamma = K\gamma 1\Delta\gamma c + K\gamma 2\Delta\gamma c' + K\gamma 3\int\Delta\gamma c\, dt$ $Fx = Kx1\, \Delta Xc + Kx2\, \Delta Xc' + Kx3\int\Delta Xc\, dt$ $Fy = Ky1\, \Delta Yc + Ky2\, \Delta Yc' + Ky3\int\Delta Yc\, dt$ $Fz = Kz1(\Delta Z + \Delta Zc) + Kz2(\Delta Z' + \Delta Zc') + Kz3\int(\Delta Z + \Delta Zc)dt$ In the range where the roll angle, pitch angle and yaw angle, longitudinal displacement amount, lateral displacement amount and vertical displacement amount of the cab 3 are small, the following motion equations are established:

$I\phi \cdot \phi 2'' = -M\phi$ $I\theta \cdot \theta 2'' = -M\theta$ $I\theta \cdot \gamma 2'' = -M\gamma$ $Mc \cdot X2'' = -Fx$ $Mc \cdot Y2'' = -Fy$ $Mc \cdot Z2'' = -Fx$ wherein $I\phi$: Roll inertia moment of cab $I\theta$: Pitch inertia moment of cab $I\gamma$: Yaw inertia moment of cab Mc: Mass of cab When the above motion equations are deformed into Laplace conversion, the following expressions are then obtained:

$(\Delta\phi + \Delta\phi c)/\phi = -I\phi s^3/(I\phi s^3 + K\phi 2\, s^2 + K\phi 1\, s + K\phi 3)$ $(\Delta\theta + \Delta\theta c)/\theta = -I\theta s^3/(I\theta s^3 + K\theta 2\, s^2 + K\theta 1\, s + K\theta 3)$ $\Delta\gamma c/\Delta\gamma = -I\gamma s^3/(I\gamma s^3 + K\gamma 2\, s^2 + K\gamma 1\, s + K\gamma 3)$ $\Delta Xc/\Delta X = -Mc\, s^3/(Mc\, s^3 + Kx2 s^2 + Kx1 s + Kx3)$ $\Delta Yc/\Delta Y = -Mc\, s^3/(Mc\, s^3 + Ky2 s^2 + Ky1 s + Ky3)$ $(\Delta Z + \Delta Zc)/Z = -Mc\, s^3/(Mc\, s^3 + Kz2 s^2 + Kz1 s + Kz3)$ Here, the response to the extremely low frequency input corresponds to the case of $s \to 0$, and the response to the high frequency input corresponds to the case of $s \to \infty$. Then, in case of $s \to 0$:

$(\Delta\phi + \Delta\phi c)/\phi \to 0$ $(\Delta\theta + \Delta\theta c)/\theta \to 0$ $\Delta\gamma c/\Delta\gamma \to 0$ $\Delta Xc/\Delta X \to 0$ $\Delta Yc/\Delta Y \to 0$ $\Delta Z + \Delta Zc/Z \to 0$ in case of $s \to \infty$:

$(\Delta\phi + \Delta\phi c)/\phi \to -1$ $(\Delta\theta + \Delta\theta c)/\theta \to -1$ $\Delta\gamma c/\Delta\gamma \to -1$ $\Delta Xc/\Delta X \to -1$ $\Delta Yc/\Delta Y \to -1$ $(\Delta Z + \Delta Zc)/Z \to -1$ With respect to the extremely low frequency input, the roll angle, pitch angle and vertical displacement amount of the cab 3 coincide with those of the road surface, and the yaw angle, longitudinal displacement amount and lateral displacement amount of the cab 3 coincide with those of the frame 25. With respect to the high frequency input, the roll angle, pitch angle and vertical displacement amount of the cab 3 are not affected by the road input and the change of road surface, and the yaw angle, longitudinal displacement amount and lateral displacement amount of the cab 3 are not affected by the displacement of the frame 25.

Accordingly, the relative roll angle $\Delta\phi c$, pitch angle $\Delta\theta c$ and yaw angle $\Delta\gamma c$ with respect to the frame 25 of the cab 3, and the longitudinal displacement amount $\Delta Xc$, lateral displacement amount $\Delta Yc$ and vertical displacement amount $\Delta Zc$ of the center of gravity of the cab, and the relative roll angle $\Delta\phi$, pitch angle $\Delta\theta$ and vertical displacement amount $\Delta Z$ with respect to the road surface of the frame 25 can be obtained from the changes of strokes XcFL, XcFC, XcFR, XcRL, XcRC and XcRR of the hydraulic actuators 19 and the relative changes of vehicle heights XFL, XFR, XRL and XRR.

$$\Delta\phi c = A\phi 1\, XcFL + A\phi 2\, XcFC + A\phi 3\, XcFR + A\phi 4\, XcRL + A\phi 5\, XcRC + A\phi 6\, XcRR$$

$$\Delta\theta c = A\theta 1\, XcFL + A\theta 2\, XcFC + A\theta 3\, XcFR + A\theta 4\, XcRL + A\theta 5\, XcRC + A\theta 6\, XcRR$$

$$\Delta\gamma c = A\gamma 1\, XcFL + A\gamma 2\, XcFC + A\gamma 3\, XcFR + A\gamma 4\, XcRL + A\gamma 5\, XcRC + A\gamma 6\, XcRR$$

$$\Delta Xc = Ax1\, XcFL + Ax2\, XcFC + Ax3\, XcFR + Ax4\, XcRL + Ax5\, XcRC + Ax6\, XcRR$$

$$\Delta Yc = Ay1\, XcFL + Ay2\, XcFC + Ay3\, XcFR + Ay4\, XcRL + Ay5\, XcRC + Ay6\, XcRR$$

$$\Delta Zc = Az1\, XcFL + Az2\, XcFC + Az3\, XcFR + Az4\, XcRL + Az5\, XcRC + Az6\, XcRR$$

$$\Delta\phi = B\phi 1\, XFL + B\phi 2\, XFR + B\phi 3\, XRL + B\phi 4\, XRR$$

$$\Delta\theta = B\theta 1\, XFL + B\theta 2\, XFR + B\theta 3\, XRL + B\theta 4\, XRR$$

$$\Delta Z = BZ1\, XFL + BZ2\, XFR + BZ3\, XRL + BZ4\, XRR$$

wherein $A\phi 1$ to $A\phi 6$: Constant determined by vehicle data
$A\theta 1$ to $A\theta 6$: Constant determined by vehicle data
$A\gamma 1$ to $A\gamma 6$: Constant determined by vehicle data
$Ax1$ to $Ax6$: Constant determined by vehicle data
$Ay1$ to $Ay6$: Constant determined by vehicle data
$Az1$ to $Az6$: Constant determined by vehicle data
$B\phi 1$ to $B\phi 4$: Constant determined by vehicle data
$B\theta 1$ to $B\theta 4$: Constant determined by vehicle data
$BZ1$ to $BZ4$: Constant determined by vehicle data Next, control torques $M\phi$, $M\theta$ and $M\gamma$ around three axes and three axial control forces Fx, Fy and Fx are obtained from the relative roll angle $\Delta\phi c$, pitch angle $\Delta\theta c$ and yaw angle $\Delta\gamma c$, and the longitudinal displacement amount $\Delta Xc$, lateral displacement amount $\Delta Yc$ and vertical displacement amount $\Delta Zc$, and the relative roll angle $\Delta\phi$, pitch angle $\Delta\theta$ and vertical displacement amount $\Delta Z$, as described above.

$$M\phi = K\phi 1(\Delta\phi + \Delta\phi c) + K\phi 2(\Delta\phi' + \Delta\phi c') + K\phi 3\int(\Delta\phi + \Delta\phi c)dt$$

$$M\theta = K\theta 1(\Delta\theta + \Delta\theta c) + K\theta 2(\Delta\theta' + \Delta\theta c') + K\theta 3\int(\Delta\theta + \Delta\theta c)dt$$

$$M\gamma = K\gamma 1\Delta\gamma c + K\gamma 2\Delta\gamma c' + K\gamma 3\int\Delta\gamma c\, dt$$

$$Fx = Kx1\,\Delta Xc + Kx2\,\Delta Xc' + Kx3\int\Delta Xc\, dt$$

$$Fy = Ky1\,\Delta Yc + Ky2\,\Delta Yc' + Ky3\int\Delta Yc\, dt$$

$$Fz = Kz1(\Delta Z + \Delta Zc) + Kz2(\Delta Z' + \Delta Zc') + Kz3\int(\Delta Z + \Delta Zc)\, dt$$

Finally, control voltages VcFL, VcFC, VcFR, VcRL, VcRC and VcRR of the oil amount control valves 16 are obtained from the following expressions:

$$VcFL = K\phi FLM\phi + K\theta FLM\theta + K\gamma FLM\gamma + KxFLFx + KyFLFy + KzFLFz$$

$$VcFC = K\phi FCM\phi + K\theta FCM\theta + K\gamma FCM\gamma + KxFCFx + KyFCFy + KzFCFz$$

$$VcFR = K\phi FRM\phi + K\theta FRM\theta + K\gamma FRM\gamma + KxFRFx + KyFRFy + KzFRFz$$

$$VcRL = K\phi RLM\phi + K\theta RLM\theta + K\gamma RLM\gamma + KxRLFx + KyRLFy + KzRLFz$$

$$VcRC = K\phi RCM\phi + K\theta RCM\theta + K\gamma RCM\gamma + KxRCFx + KyRCFy + KzRCFz$$

$$VcRR = K\phi RRM\phi + K\theta RRM\theta + K\gamma RRM\gamma + KxRRFx + KyRRFy + KzRRFz$$

wherein $K\phi FL$ to $K\phi RR$: Constant determined by data of vehicle and hydraulic circuit $K\theta FL$ to $K\theta RR$: Constant determined by data of vehicle and hydraulic circuit $K\gamma FL$ to $K\gamma RR$: Constant determined by data of vehicle and hydraulic circuit $KxFL$ to $KxRR$: Constant determined by data of vehicle and hydraulic circuit $KyFL$ to $KyRR$: Constant determined by data of vehicle and hydraulic circuit $KzFL$ to $KzRR$: Constant determined by data of vehicle and hydraulic circuit If the vehicle height is adjusted by the hydraulic actuators 19 and the feedback control is carried out, the attitude of the cab 3 can be made flat to the road surface, and the yaw, longitudinal and lateral vibrations transmitted to the cab 3 can be reduced.

As shown in FIG. 2, in the present invention, the vibrations of the cab 3 are suppressed, in accordance with the above-mentioned principle, to control the attitude of the cab 3 so as to always keep it parallel to the road surface. That is, six hydraulic actuators 19 each provided with a pneumatic spring 18 are connected between six points of the cab 3 and the frame 25. The hydraulic actuators are positioned with lines of action in different directions. Three relative displacements of longitudinal, lateral and vertical directions and three relative rotational displacements on the longitudinal axis "y", lateral axis "x" and vertical axis "z" are obtained from signals of stroke sensor 28 and provided on the respective hydraulic actuators 19 and signals of the vehicle height sensor 31 disposed between the frame 25 and the four wheel support axles 30 by the relative displacement amount calculation analyzer 35. A vibration control signal is obtained by the analyzer 37 from the relative displacement signals and differential and integrated values thereof. The control signals are used by the control 39 to regulate oil flow to the hydraulic actuators 19 so as to reduce vibrations of the cab 3.

FIGS. 3 to 6 are respectively flow diagrams of a control program for carrying out the above-mentioned control by an electronic control device composed of a micro-computer. p11 to p23, p41 to p46 and p51 to p57 represent steps of the control program. In p11, a control program is started. In p12, initialization is carried out. In p13, the process shifts to a oil pressure holding routine, where the switching valve 12 of oil pressure holding means A is driven to keep an output oil pressure pm a predetermined value pt. In response to outputs from the cab sensors 28 and the frame sensors 31, the analyzer control 35 provides control output values proportional to vertical, roll and pitch motions of the frame 25 relative to the wheels 20 and vertical, longitudinal, lateral, roll, pitch and yaw motions of the cab 3 relative to the frame 25.

In p14, the relative vehicle height variations XFL to XRR of the frame 25 with respect to the road surface are read, and in p15, the strokes XcFL to XcRR of the hydraulic actuators 19 are read. In p16, the relative roll angle $\Delta\phi$, pitch angle $\Delta\theta$ and vertical displacement amount $\Delta Z$ of the frame 25 with respect to the road surface are obtained. In p17, the relative roll angle $\Delta\phi c$, pitch angle $\Delta\theta c$ and yaw angle $\Delta\gamma c$ of the cab 3 with respect to the frame 25 are obtained. In p18, the total roll control torque $M\phi$, pitch control torque $M\theta$ and yaw control torque $M\gamma$ around the center of gravity of the cab, which are given to the cab 3 by the hydraulic actuators 19.

In p19, the londitudinal displacement amount $\Delta Xc$, lateral displacement amount $\Delta Yc$ and vertical displacement amount ΔZc of the center of gravity of the cab with respect to the frame 25 are obtained, and in p20, the londitudinal displacement control force Fx, lateral displacement control force Fx and vertical control force Fz, which are given to the cab 3 by the hydrawlic actuators 19, are obtained. In p21, the control voltages VcFL to VcRR of the oil amount control valves 16, respectively, are obtained, and in p22, the process shifts to the hydraulic actuator driving routine shown in FIG. 6, where oil amounts of the hydraulic actuators 19 are regulated by the oil amount control valves 16.

Figure 5:
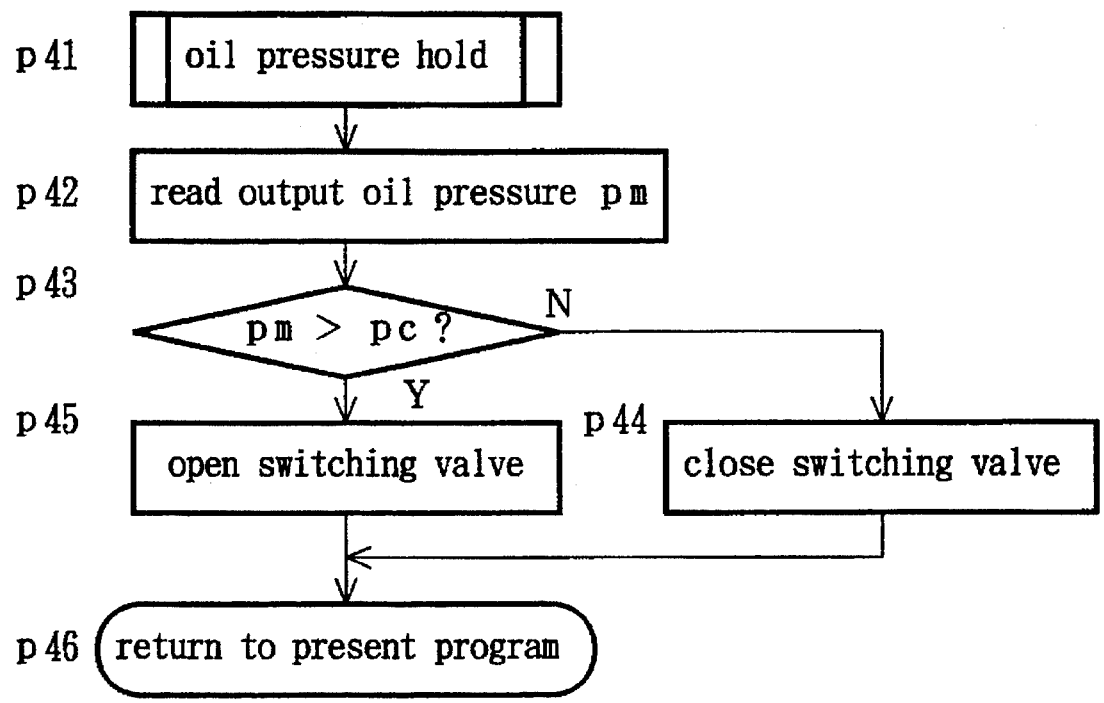
FIG. 5 is a flow diagram of an attitude control program for the system of FIG. 2.

As shown in FIG. 5, the oil pressure holding routine starts in p41, and in p42, output oil pressure pm of the hydraulic pump 4 is red by the oil pressure holding means A. In p43, determination is made whether or not the output oil pressure pm is higher than a predetermined value pc. If the output oil pressure pm is smaller than the predetermined value pc, the switching valve 12 is closed, in p44, to increase the output oil pressure pm, whereas if the output oil pressure pm is higher than the predetermined value pc, the switching valve 12 is opened, in p45, to decrease the output oil pressure pm to keep it the predetermined value pc, and in p46, the process returns to the present program.

Figure 6:
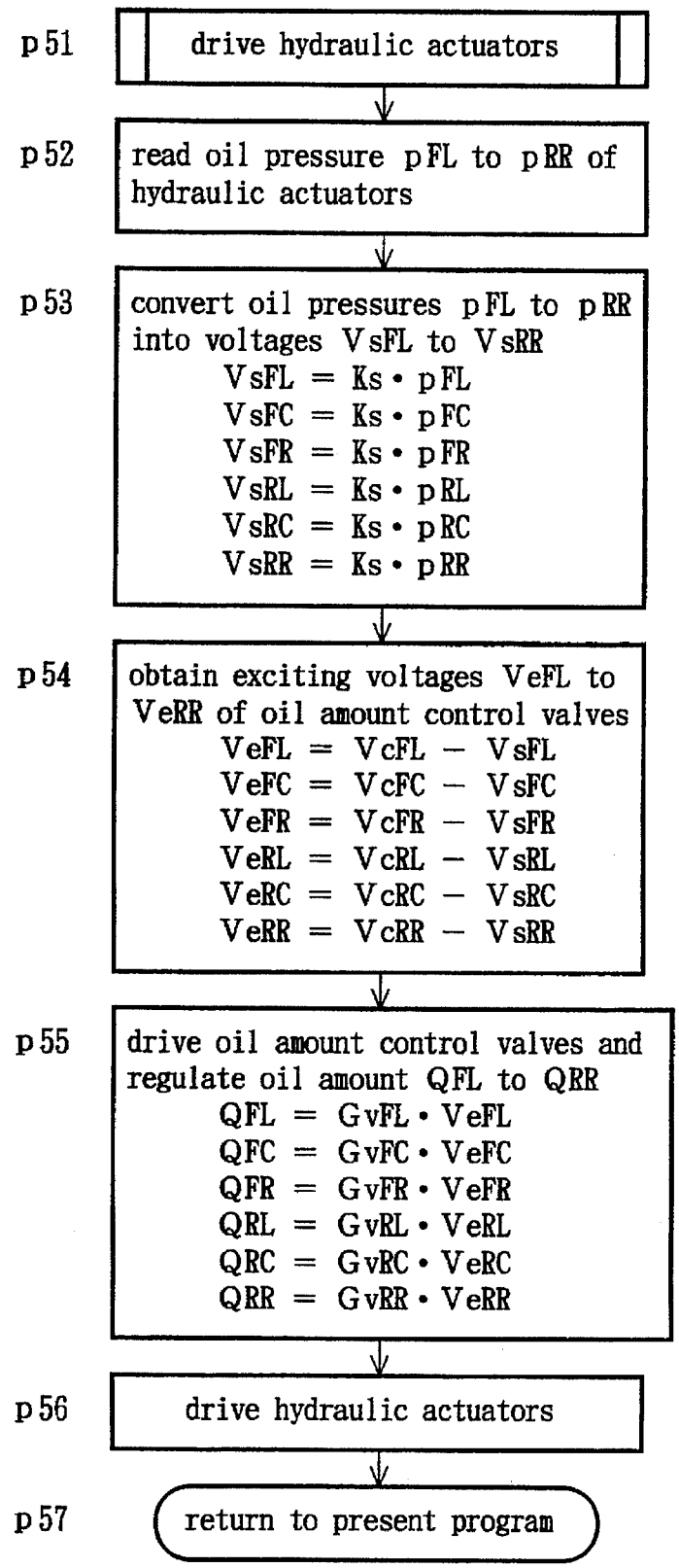
FIG. 6 is a flow diagram of an attitude control program for the system of FIG. 2.

As shown in FIG. 6, the hydraulic actuator driving routine starts in p51. In p52, oil pressure pFL to pRR of the hydraulic actuators 19 are read from the hydraulic sensors 17, and in p53, the oil pressures pFL to pRR are converted into voltages V6FL to V6RR. In p54, exciting voltages VeFL to VeRR of the oil amount control valves 16 are obtained from the aforementioned control voltages VcFL to VcRR and voltages V6FL to V6RR. In p55, the oil amount control valves 16 are excited to regulate oil amounts QFL to QRR to be supplied to or discharged from the hydraulic actuators 19. In p56, the hydraulic actuators 19 are driven, and in p57, the process returns to the present program.

Figure 7:
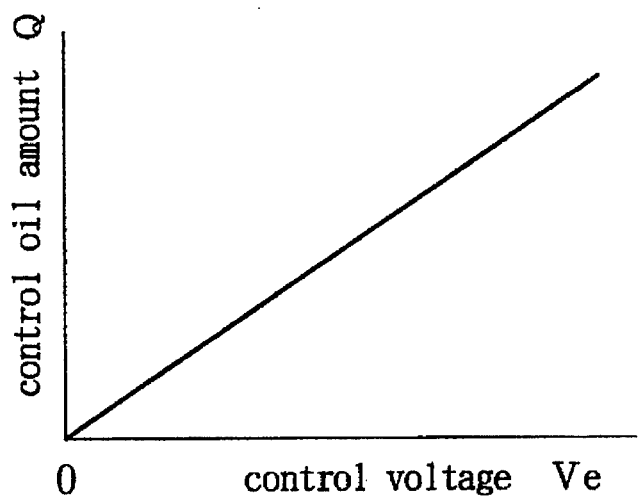
FIG. 7 is a flow diagram showing a relationship between control voltage and an oil flow amount to a control valve.

As shown in FIG. 7, oil amounts QFL to QRR to the hydraulic actuators 19 are reglated by the exciting voltages VeFL to VeRR of the oil amount control valves 16.

As described above, the six cab motion freedoms of roll, pitch, yaw, longitudinal displacement, lateral displacement and vertical displacement are controlled so that the attitude of the cab is always maintained stable with respect to a road surface. Thus, longitudinal and lateral vibrations are reduced to improve riding comfort and cab height is maintained constant to improve visibility. Also, the use of six identical hydraulic actuators and stroke sensors reduces production cost.

Obviously, many modifications and variations of the present invention are possible in light of the above teachings. It is to be understood, therefore, that the invention can be practiced otherwise than as specifically described.

What is claimed is:

1. A road vehicle cab attitude controlling apparatus comprising:

frame means for supporting wheels of a vehicle;

cab means mounted on said frame means and movable relative thereto, said cab means adapted for receiving occupants of the vehicle;

cab sensing means for detecting, between said frame means and a plurality of spaced apart portions of said cab means, cab displacements comprising a plurality of substantially vertical displacements, and at least three displacements extending in directions not joined at a single point and each including vertical, longitudinal and lateral components; said cab sensing means providing cab sensor outputs dependent on said detected cab displacements;

cab actuator means for independently adjusting each of said cab displacements; and control means providing cab control outputs for controlling said cab actuator means in response to said cab sensor outputs; said control means comprising analyzer means receiving said cab sensor outputs and producing in response thereto said cab control outputs; and wherein said cab control outputs are proportional to, respectively, vertical, longitudinal, lateral, roll, pitch and yaw motions of said cab means relative to said frame means.

2. Apparatus according to claim 1 including frame support means permitting relative movement between said frame means and the wheels; frame sensing means for detecting frame displacements between the wheels and each of a plurality of positions on said frame adjacent to different portions of said cab means, said frame sensing means providing frame sensor outputs dependent on said detected frame displacements; and wherein said analyzer means also receives said frame sensor outputs and produces in response thereto frame control outputs, and said control means controls said cab actuator means in response to both said cab control outputs and said frame control outputs.

3. Apparatus according to claim 2 wherein said frame control outputs are proportional to; respectively; vertical, roll and pitch motions of said frame means relative to said wheels; and said cab and frame control outputs control said cab actuator means to maintain a stable orientation of said cab means with respect to a surface during movement thereon of the vehicle.

4. Apparatus according to claim 3 wherein said cab actuator means comprises a cab hydraulic actuator pivotally connected between said frame means and each of said spaced apart portions of said cab means, and each said cab hydraulic actuator being extendable in said directions including vertical, longitudinal and lateral components.

5. Apparatus according to claim 4 wherein each of said frame displacements is substantially vertical.

6. Apparatus according to claim 4 wherein each said cab hydraulic actuator includes a hydraulic circuit and said control means further comprises control valves for regulating fluid flow to said hydraulic circuits.

7. Apparatus according to claim 1 wherein said analyzer comprises a computer.

* * * * *

UNITED STATES PATENT AND TRADEMARK OFFICE
CERTIFICATE OF CORRECTION

PATENT NO.   : 5,642,282
DATED        : June 24, 1997
INVENTOR(S)  : Tsutomu Sonehara It is certified that error appears in the above-indentified patent and that said Letters Patent is hereby corrected as shown below:

Column 2, line 48, cancel "suppored" and
         substitute therefor --supported--.

Column 6, line 67, cancel "amout" and substitute
         therefor --amount--.

Column 7, line 2, cancel "londitudinal" and
         substitute therefor --longitudinal--.

Column 7, line 36, cancel "reglated" and
         substitute therefor --regulated--.

Signed and Sealed this

Eighteenth Day of August, 1998

Attest:

BRUCE LEHMAN

*Attesting Officer*        *Commissioner of Patents and Trademarks*